(12) United States Patent
Sigwanz et al.

(10) Patent No.: US 6,366,677 B1
(45) Date of Patent: Apr. 2, 2002

(54) METHOD AND DIGITAL HEARING DEVICE FOR DETECTING AND PROCESSING NON-SYNCHRONOUS PROCESSES IN A DIGITAL HEARING DEVICE

(75) Inventors: Ullrich Sigwanz, Hausen; Fred Zoels, Altenthann, both of (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 0 days.

(21) Appl. No.: 09/175,322

(22) Filed: Oct. 20, 1998

(30) Foreign Application Priority Data

Oct. 24, 1997 (DE) .......................................... 197 47 126

(51) Int. Cl.[7] .............................................. H04R 25/00
(52) U.S. Cl. ..................................... 381/314; 381/312
(58) Field of Search ................................ 381/314, 315, 381/316, 317, 318, 320, 321, 60, 23.1

(56) References Cited

U.S. PATENT DOCUMENTS 5,155,839 A * 10/1992 Weppler ..................... 395/500

FOREIGN PATENT DOCUMENTS

EP          0 796 035          9/1997

OTHER PUBLICATIONS

"Peripheriebausteine: Bindeglieder zwischen Prozessor und Umwelt," Dorn, Elektronik, vol. 19 (1981), pp. 51–59.
"Mikroprozessor steuert vollautomatische Waschmaschine," Sendler et al., Elektronik, vol. 11 (1976), pp. 77–82.
"Der Interrupt–Controller–ein Baustein, der für Ordnung sorgt," Wätring, Elektronik, vol. 10 (1979), pp. 73–80.

* cited by examiner

*Primary Examiner*—Sinh Tran
(74) *Attorney, Agent, or Firm*—Schiff Hardin & Waite

(57) ABSTRACT

In a method and a hearing device for allowing processes arising in non-synchronous fashion relative to the execution of loaded programs for signal processing in a hearing device with digital signal processing to be taken into consideration at a time approximately contemporaneous with the occurrence of the non-synchronous process, first the occurrence of a non-synchronous process is detected, followed by an interruption of the execution of the loaded program or an avoidance of the starting of a new program. In a further step a classification of the non-synchronous process with respect to the process type and a decision is made as to whether the loaded program should be continued at a new program step or a suitable new program should be selected, depending on this decision, either a continuation of the loaded program takes place at a new program step, or a selection, loading and execution of a new program is undertaken.

15 Claims, 1 Drawing Sheet

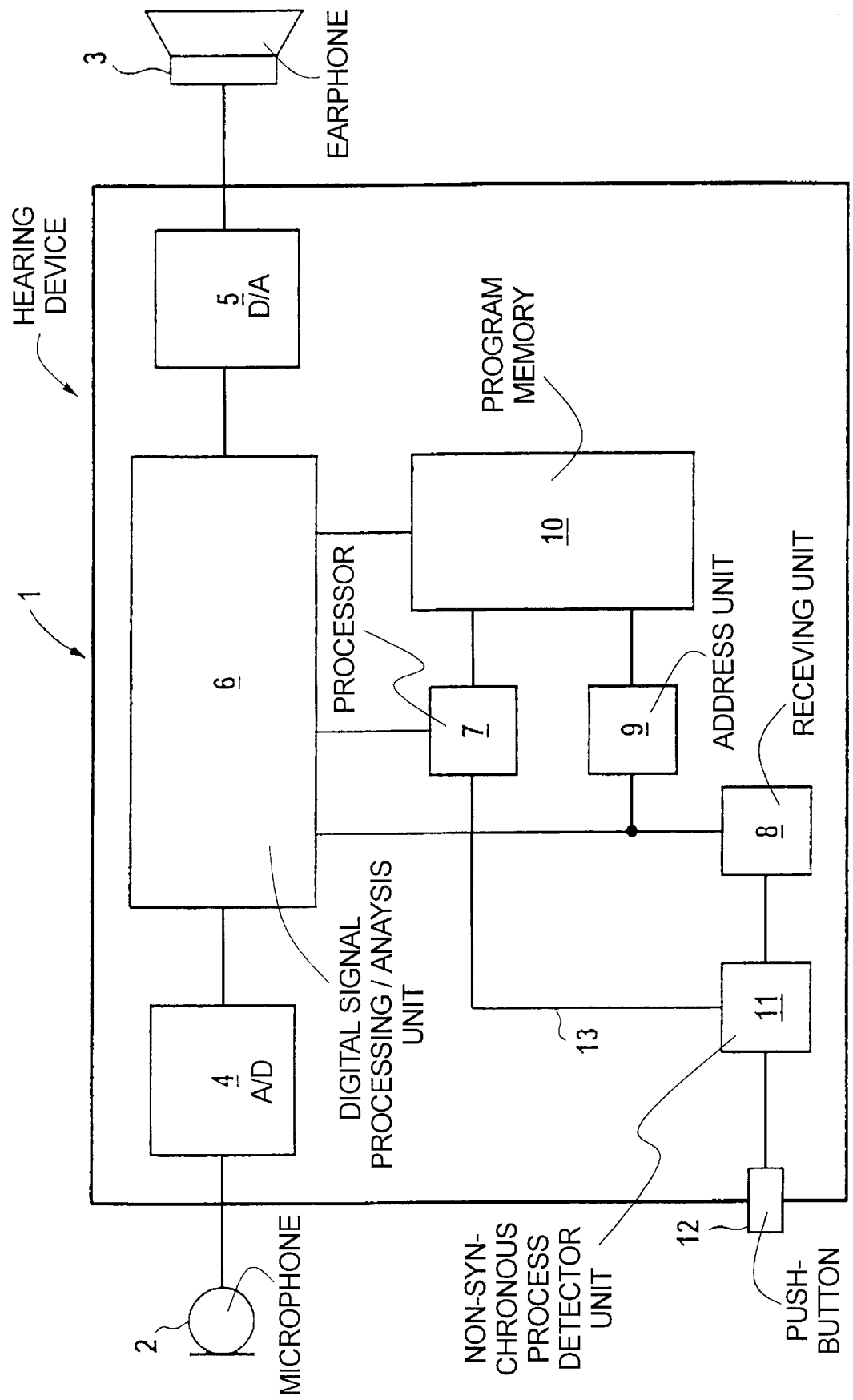

METHOD AND DIGITAL HEARING DEVICE FOR DETECTING AND PROCESSING NON-SYNCHRONOUS PROCESSES IN A DIGITAL HEARING DEVICE

BACKGROUND OF THE INVENTION

1. Field of the Invention

The present invention relates to a method for the detection and processing of processes or events arising in non-synchronous fashion with respect to the execution of loaded programs for signal processing in hearing devices with digital signal processing. The invention further relates to a digital hearing device operating in accordance with this method.

2. Description of the Prior Art

In hearing devices with digital signal processing the signal processing occurs by means of sequential programs which are selected and loaded. A changeover to a new sequential program, or to a new operating condition, usually can occur only subsequent to the completion of the execution of such sequential programs.

SUMMARY OF THE INVENTION

An object of the present invention is to provide a method and a digital hearing device which react to non-synchronous processes in an optimally variable fashion despite loaded sequential programs, wherein the running signal processing is interrupted only for an optimally short time. A rapid reaction to new operating conditions or environmental conditions should be enabled.

This object is achieved in the inventive method which includes a step wherein the occurrence of a non-synchronous process, i.e. a process or event that arises during the execution of a program for signal processing that does not stand in direct connection with this program. This can be, for example, processes external to the hearing device, such as a keystroke, or signals internal to the hearing device, such as states of counter units or detector signals.

Such non-synchronous processes (the term "processes" also including events) during the execution of a loaded program were disregarded in conventional hearing aid devices and operating methods and could be taken into account only following completion of the program execution.

The delay times arising due to this shortcoming in conventional devices and methods can have unpleasant or dangerous consequences for the user of the digital hearing device given certain non-synchronous processes (such as the notification of a diminishing and insufficient current).

In the inventive method in a second step the program for signal processing that is loaded and running is interrupted or an imminent start of a new program is avoided, upon an identification of a non-synchronous process.

In a third step of the method, either the previously loaded program is continued at a new program step, allowing a reaction to the detected non-synchronous process to occur, or alternatively a new program can be selected and loaded to enable a correspondingly adapted reaction to the non-synchronous process.

In sum, the rigid program flow structure of a conventional digital hearing device is inventively interrupted and a corresponding rapid, uninterrupted reaction to non-synchronous processes arising during a program run is enabled.

In another step the detected non-synchronous processes are classified with respect to defined criteria (e.g. relevance to the safety or the comfort of the user). Thus, given particularly important non-synchronous processes (e.g. an internal message about diminishing battery power), a correspondingly rapidly reacting interruption of the running program and a particularly swift changeover to a new program (e.g. an emergency program) can occur.

In order to enable a particularly swift and comfortable interruption of running programs, in an embodiment of the inventive method the programs loaded in the hearing device include respective steps at which an interruption of the program is respectively expressly enabled given the detection of non-synchronous processes.

To avoid an abrupt interruption of a running program, in an embodiment of the method a delay is inserted between the detection of a non-synchronous process and the actual program interruption. This delay arising in the program interruption can be realized by the prescription of a delay time or by the prescription of a defined minimum number of program steps of the loaded program for signal processing which have yet to be executed.

Further steps, branches or subroutines can be provided in the individual programs for signal processing, which permit a swift continuation in the running program subsequent to the interruption due to the occurrence and detection of a non-synchronous process without a new main (basic) program having to be loaded.

Not only events external to the hearing device (e.g. a keystroke by the user) but also processes and events internal to the hearing device (e.g. condition parameters and commands of the processor) can be detected as non-synchronous processes.

A comprehensive coverage of all types of information arising outside the rigid program flow thus is achieved.

Certain programs for signal processing can be designated on the basis of their fundamental significance for safety and/or comfort, so that in the execution of such a program—despite the occurrence of non-synchronous processes—an interruption does not ensue, or ensues only at a considerably later time.

With the aid of a decision program it can be judged whether an interruption should take place dependent on the urgency of the detected non-synchronous process in relation to the significance of the running program.

The inventive method further enables the determination of a delay time for each classification type of a non-synchronous process, subsequent to which a program interruption should take place given the detection of the respective non-synchronous process. This allows importance and significance of the non-synchronous processes to be ascertained.

The inventive digital hearing device includes a detector unit which detects non-synchronous processes external or internal to the hearing device.

Subsequent to the detection, these non-synchronous processes are preferably conducted from the detector unit to a receiving unit via which an interruption of the running program, or the avoidance of starting a new program, is carried out.

The receiving unit additionally provides for the continuation of the existing program at a new program step or for the selection and loading of a new program for continuation on the basis of the occurrence of a non-synchronous process.

The detector unit and/or receiving unit are preferably connected to the processor of the hearing device and/or to an address unit for actuation of the program memory for the programs for the signal processing. A rapid access to new programs to be selected on the basis of the detected non-synchronous process can thereby ensue proceeding from the receiving unit via the address unit.

A classification of the non-synchronous processes detected by the detector unit also inventively ensues in the receiving unit. On the basis of this classification result it can then be determined by a decision program integrated in the receiving units, for example, whether a new program should be selected subsequent to the interruption, or whether a continuation of the program already running at a new program step is preferable.

The receiving unit and/or of the detector unit can also be adapted to the detection and processing of new types of non-synchronous processes by allowing these units to be suitable programmed.

DESCRIPTION OF THE DRAWING

The FIGURE is a schematic block diagram of an exemplary embodiment of a hearing device constructed and operating in accordance with the principles of the present invention.

DESCRIPTION OF THE PREFERRED EMBODIMENTS

The hearing device 1 includes a microphone 2 via which the input signal is conducted to a digital signal analysis/processing unit 6 via an analog/digital converter 4.

The processed signal is then conducted to an earphone 3 via a digital/analog converter 5.

The digital signal processing/analysis unit 6 is controlled by a processor 7, which prompts a loading of the programs for signal processing stored in a program memory 10.

The hearing device 1 further has a detector unit 11 which detects the occurrence of non-synchronous processes, such as the actuation of the pushbutton 12 by the user of the hearing device 1, for example.

Subsequent to the detection of the non-synchronous process by the detector unit 11, a message is supplied to the receiving unit 8, which is connected with the processor 7 and the address unit 9.

Proceeding from the receiver unit 8, given the presence of a non-synchronous process, an interruption of a program currently running for signal processing in the signal processing/analysis unit 6 can be executed by means of a command to the processor 7.

The receiving unit 8 can subsequently retrieve a corresponding new program from the program memory by actuation of the address unit 9 in order to activate a new program for signal processing in the signal processing/analysis unit 6 in reaction to the detected non-synchronous process.

A reaction to the non-synchronous process detected by the detector unit 11 thus ensues.

The detector unit 11 is also connected with the processor 7 via a line connection 13 in order to be able to pick up non-synchronous processes (e.g. processor conditions) internal to the hearing device and to forward them to the receiving unit 8 in the same manner as detected external processes.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for operating a hearing device comprising the steps of:
    picking up incoming audio signals supplied to a hearing device;
    digitally processing and analyzing said audio signals by executing a loaded processing and analysis program in a digital processor in said hearing device;
    maintaining at least one new program available for use by said digital processor in addition to said loaded program;
    detecting an occurrence of a non-synchronous process which is non-synchronous relative to said loaded program;
    upon detection of said occurrence of said non-synchronous process, conducting a responsive step in said digital processor selected from the group consisting of interrupting execution of said loaded program and avoiding starting of a new program;
    classifying said non-synchronous process with respect to whether the occurrence of said non-synchronous process makes continuing execution of said loaded program at a new step of said loaded program, or selection of a new program, more appropriate; and
    dependent on said classification of said non-synchronous process, continuing said loaded program at said new program step or selecting and loading and executing a new program.

2. A method as claimed in claim 1 wherein said loaded program includes program steps for interrupting execution of said loaded program and classifying said non-synchronous process.

3. A method as claimed in claim 1 comprising after detection of the occurrence of said non-synchronous process, continuing execution of said loaded program for a prescribed number of program steps of said loaded program.

4. A method as claimed in claim I comprising interrupting execution of said loaded program following an adjustable delay after detection of the occurrence of said non-synchronous process.

5. A method as claimed in claim 1 comprising the additional step of including a subroutine in said loaded program for continuing said loaded program subsequent to interruption of said loaded program upon detection of said non-synchronous process.

6. A method as claimed in claim 1 wherein the step of detecting the occurrence of a non-synchronous process comprises detecting a non-synchronous process occurring external to said hearing device.

7. A method as claimed in claim 1 wherein the step of detecting the occurrence of a non-synchronous process comprises detecting a non-synchronous process occurring internal to said hearing device.

8. A method as claimed in claim 1 comprising the additional step of identifying at least one loaded program as being immune from interruption upon detection of the occurrence of a non-synchronous process.

9. A method as claimed in claim 1 comprising the additional steps of:
    associating a predetermined delay respectively with a plurality of different non-synchronous process; and
    upon a detection of one of said plurality of non-synchronous processes, delaying interruption of the execution of the loaded program by the delay associated with the detected non-synchronous process.

10. A hearing device comprising:

means for picking up incoming audio signals;

processor means for digitally processing and analyzing said audio signals by executing a loaded processing and analysis program;

means for maintaining at least one new program available for use by said processor means in addition to said loaded program;

detector means for detecting an occurrence of a non-synchronous process which is non-synchronous relative to said loaded program;

means for, upon detection of said occurrence of said non-synchronous process, conducting a responsive step selected from the group consisting of interrupting execution of said loaded program and avoiding starting of said new program;

means for classifying said non-synchronous process with respect to whether the occurrence of said non-synchronous process makes continuing execution of said loaded program at a new stop of said loaded program, or selection of a new program, more appropriate; and said processor means comprising means for, dependent on said classification of said non-synchronous process, continuing said loaded program at said new program step or selecting and loading and executing a new program.

11. A device as claimed in claim 10 wherein said processor means comprises after detection of the occurrence of said non-synchronous process, continuing execution of said loaded program for a prescribed number of program steps of said loaded program.

12. A device as claimed in claim 10, wherein said processor means comprises interrupting execution of said loaded program following an adjustable delay after detection of the occurrence of said non-synchronous process.

13. A device as claimed in claim 10 wherein said detector means comprises means for detecting a non-synchronous process occurring external to a hearing device.

14. A device as claimed in claim 10 wherein said detector means comprises means for detecting a non-synchronous process occurring internal to a hearing device.

15. A device as claimed in claim 10 comprising:

means for storing plurality delays respectively associated with a plurality of different non-synchronous process; and said processor means having access to said means for storing and including means for, upon a detection of one of said plurality of non-synchronous processes, delaying interruption of the execution of the loaded program by the delay associated with the detected non-synchronous process.

* * * * *